United States Patent
Jarosinski et al.

(10) Patent No.: US 9,622,177 B2
(45) Date of Patent: Apr. 11, 2017

(54) CONTEXT AWARE SYSTEM WITH MULTIPLE POWER CONSUMPTION MODES

(71) Applicant: QUALCOMM Incorporated, San Diego, CA (US)

(72) Inventors: Tadeusz Jarosinski, San Diego, CA (US); Shankar Sadasivam, San Diego, CA (US); Ryan Michael Carey, San Diego, CA (US); Jinwon Lee, San Diego, CA (US); Bhuwan Dhingra, New Delhi (IN); Abhijeet Bisain, San Diego, CA (US); Vitor Rocha de Carvalho, San Diego, CA (US); Rajeev Jain, San Diego, CA (US); Muralidhar Reddy Akula, San Diego, CA (US); Ashwin Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/820,340

(22) Filed: Aug. 6, 2015

(65) Prior Publication Data

US 2017/0041874 A1    Feb. 9, 2017

(51) Int. Cl.
*H04M 1/00* (2006.01)
*H04W 52/02* (2009.01)
*H04L 12/26* (2006.01)

(52) U.S. Cl.
CPC ......... *H04W 52/0225* (2013.01); *H04L 43/16* (2013.01)

(58) Field of Classification Search
CPC ......... H04M 1/72569; H04M 1/72572; H04M 2250/12; H04M 15/44; H04M 15/58;
(Continued)

(56) References Cited

U.S. PATENT DOCUMENTS

2012/0289244 A1    11/2012 Goyal
2012/0299828 A1    11/2012 Grokop et al.
(Continued)

FOREIGN PATENT DOCUMENTS

| KR | 101181301 B1 | 9/2012 |
| WO | 2013093173 A1 | 6/2013 |
| WO | 2014089749 A1 | 6/2014 |

OTHER PUBLICATIONS

International Search Report and Written Opinion—PCT/US2016/041033—ISA/EPO—Sep. 21, 2016.
(Continued)

*Primary Examiner* — Golam Sorowar
(74) *Attorney, Agent, or Firm* — Muncy, Geissler, Olds & Lowe, P.C.

(57) ABSTRACT

A context aware system, for use in a mobile device, includes a context change detector (CCD) coupled to a context classifier (CCL). The CCD is configured to receive sensor data and to detect a change in a current context state of the mobile device based on the received sensor data. The CCL is configured to transition from a low power consumption mode to a normal power consumption mode in response to the CCD detecting the change in the current context state. The CCL is further configured to determine a next context state of the mobile device while in the normal power consumption mode.

22 Claims, 6 Drawing Sheets

(58) Field of Classification Search
CPC . H04M 15/745; H04M 15/8083; H04W 4/02; H04W 52/0254; H04W 64/00; H04W 24/02; H04W 4/023; H04W 4/027; H04L 67/18; H04L 12/5815; H04L 12/5895; H04L 43/0817; H04L 51/043; H04L 51/38; H04L 67/104
See application file for complete search history.

(56) References Cited

U.S. PATENT DOCUMENTS

| | | | | |
|---|---|---|---|---|
| 2013/0238921 | A1* | 9/2013 | Alpert | G06F 1/3246 713/323 |
| 2014/0136696 | A1* | 5/2014 | Leppanen | G01S 5/02 709/224 |
| 2014/0368688 | A1 | 12/2014 | John Archibald et al. | |
| 2015/0024778 | A1* | 1/2015 | Granito | G01C 21/00 455/456.1 |

OTHER PUBLICATIONS

Khabou N., et al., "A Threshold based Context Change Detection in Pervasive Environments: Application to a Smart Campus," Procedia Computer Science, vol. 32, Jan. 1, 2014, pp. 461-468, XP055302621, Amsterdam, NL ISSN: 1877-0509, DOI: 10.1016/j.procs.2014.05.448.

McConnel T, "Ultra-low Power Sensor Hub for Android 4A," Embedded, Mar. 19, 2014, XP055302569, Retrieved from the Internet: URL:http://www.embedded.com/print/4429547 [retrieved on Sep. 14, 2016], 2 pages.

Steele J, "Enabling Low-power Sensor Context on Mobile Devices," Jul. 22, 2013, XP55302561, Retrieved from the Internet: URL:http://www.edn.com/Pdf/ViewPdf?contentItemId=4418673 [retrieved on Sep. 14, 2016], 7 pages.

* cited by examiner

CONTEXT AWARE SYSTEM WITH MULTIPLE POWER CONSUMPTION MODES

TECHNICAL FIELD

This disclosure relates generally to computing devices, such as mobile devices, and, in particular but not exclusively, relates to context aware system for determining a context state of the computing device.

BACKGROUND INFORMATION

Mobile devices (e.g., cellular phones) are packed with sensors such as accelerometers, magnetometers, gyroscopes, pressure, temperature, light (ALS, RGB, etc.) and proximity sensors, Bluetooth and Wi-Fi radios, GPS, a microphone, camera, etc. These sensors can be leveraged to collect contextual data about the user's actions and surroundings. This data provides an opportunity for mobile devices to become truly smart devices by gaining the ability to understand and leverage the context to intelligently enhance the user experience. Examples of such enhancements are personalization of user interaction (e.g., by adapting the interaction due to preferences) or altering the interaction based on the user context (e.g., adapting the interaction model, modality, or content based on the activity or situation of the user). Moreover, as devices are typically within close proximity to the user, context is available on demand, which is not the case for other computing platforms. Devices could automatically learn to adapt properties based on the situation or activity of users such as "put device on vibrate at dinner" or "enable Bluetooth when leaving home". This illustrates how user behavior models (e.g. preferences of the user) in combination with contextual awareness (e.g. at a restaurant, in a meeting, or in a conversation) can be combined to enhance the user experience. This opens the flood gates to a range of potential applications that enhance the user experience.

A step towards truly smart devices is context awareness. In one aspect "context awareness" refers to any information that can be used to characterize the situation of the user. Context awareness may allow the discovery of answers to one or more of the following questions: (1) What is the user doing?; (2) What environment are they in?; (3) Where are they?; and (4) What are their intentions? Contextual awareness is inherently dependent on two things: (a) discovery of relevant states; and (b) recognition of state occurrences (e.g. motion states, device positions, places, ambiences, or activities). In one aspect, a system can be still be context aware even if the human is in the loop providing support in discovery, recognition, or both. For example, some location-based services rely on humans to discover relevant states (places), e.g. annotating relevant places on a map, and provide the ability to recognize state occurrences (revisits). Systems based on motion-states or based on ambience states are further examples where the state discovery is often supervised by humans and the ability of recognition provided by the system.

One type of context is the place of a user. A "place" may refer to a physical location with some regional expansion. In terms of the regional expansion, notions of a macro place may be differentiated from those of a micro place. A macro place refers to a place on the level of buildings or blocks, e.g. home, work, mall, or park, while a micro place refers to a place on the level of rooms, e.g. living room, office, men's section in a department store. The relevance of a place often depends on the activity and intent of a user. A relevant place to a user might be the restaurant at which a user has dinner. However, the same restaurant might not be a relevant place at all times. Consider the same user passing by the restaurant going for a walk. The restaurant may no longer be relevant as it is not semantically meaningful with respect to the current activity, namely going for a walk. Identifying which places are relevant is a very challenging problem and difficult to define without a specific application or use case in mind.

Often, machine learning algorithms are applied to run in the background of the mobile device in an always-on mode to continuously identify user context. These algorithms are becoming more and more complex and elaborate, with ever increasing number of context states and requirements for improved accuracy (precision and recall figures) of user context identification. This trend towards more complex contextual awareness algorithms in mobile devices is adversely affecting power consumption.

BRIEF SUMMARY

According to one aspect of the present disclosure, a context aware system includes a context change detector (CCD) coupled to a context classifier (CCL). The CCD is configured to receive sensor data and to detect a change in a current context state of the mobile device based on the received sensor data and optional thresholds and/or parameters configured according to the current state. The CCL is configured to transition from a low power consumption mode (e.g., power sleep or power collapse mode) to a normal power consumption mode in response to the CCD detecting the change in the current context state. The CCL is further configured to determine a next context state of the mobile device while in the normal power consumption mode, and then passes the information about the next context state to the CCD, before returning to the low power consumption mode A method is provided in another aspect of the present disclosure. The method includes receiving sensor data at a context change detector (CCD) of a context aware system included in a mobile device. The CCD detects a change in a current context state of the mobile device based on the received sensor data and optional parameters configured according to the current state, and then sends an indication of the change in the current context state to a context classifier (CCL) of the context aware system in response to the CCD detecting the change. The method also includes transitioning the CCL resource from a low power consumption mode to a normal power consumption mode in response to receiving the indication of the change in the current context state, and determining, by the CCL, a next context state of the mobile device while it is in the normal power consumption mode.

According to another aspect of the present disclosure, a context aware system may include means for receiving sensor data at a context change detector (CCD) of the context aware system. The context aware system may further include means for detecting, by the CCD, a change in the a current context of the mobile device based on the received sensor data and optional thresholds and/or parameters configured according to the current state, and means for sending an indication of the change in the current context state to a context classifier (CCL) of the context aware system in response to the CCD detecting the change. Means for transitioning the CCL from a low power consumption mode to a normal power consumption mode in response to receiving the indication of the change in the current context state are also included in the context aware system. The context aware system also includes means for determining, by the CCL, a next context state of the mobile device while in the normal power consumption mode.

In yet another aspect of the present disclosure, a non-transitory computer readable medium is provided. The non-transitory computer readable medium includes program code stored thereon for use by a context aware system of a mobile device. The program code includes instructions to: (1) receive sensor data at a context change detector (CCD) of the context aware system; (2) detect, by the CCD, a change in the a current context of the mobile device based on the received sensor data and optional thresholds/parameters configured according to the current state; (3) send an indication of the change in the current context state to a context classifier (CCL) of the context aware system in response to the CCD detecting the change; (4) transition the CCL from a low power consumption mode to a normal power consumption mode in response to receiving the indication of the change in the current context state; and (5) determine, by the CCL, a next context state of the mobile device while in the normal power consumption mode.

BRIEF DESCRIPTION OF THE DRAWINGS

Non-limiting and non-exhaustive examples of the invention are described with reference to the following figures, wherein like reference numerals refer to like parts throughout the various views unless otherwise specified.

DETAILED DESCRIPTION

Reference throughout this specification to "one example", "an example", "one aspect", "an aspect" means that a particular feature, structure, or characteristic described in connection with the aspect or example is included in at least one example of the present invention. Thus, the appearances of the phrases "in one example" or "in an example" in various places throughout this specification are not necessarily all referring to the same example. Furthermore, the particular features, structures, or characteristics may be combined in any suitable manner in one or more examples. Any example or aspect described herein is not to be construed as preferred or advantageous over other examples or aspects.

Accordingly, aspects of the present disclosure include a method, a context aware system, and a computer-readable medium for use in a mobile device that includes: (1) determining whether a current context state of a mobile device has changed; and (2) determining a next context state of the mobile device, while maintaining multiple power consumption modes. In one example, the power consumption modes may include a low power consumption mode and a normal power consumption mode for determining changes in the current context state and for determining the next context state of the mobile device respectively.

Figure 1:
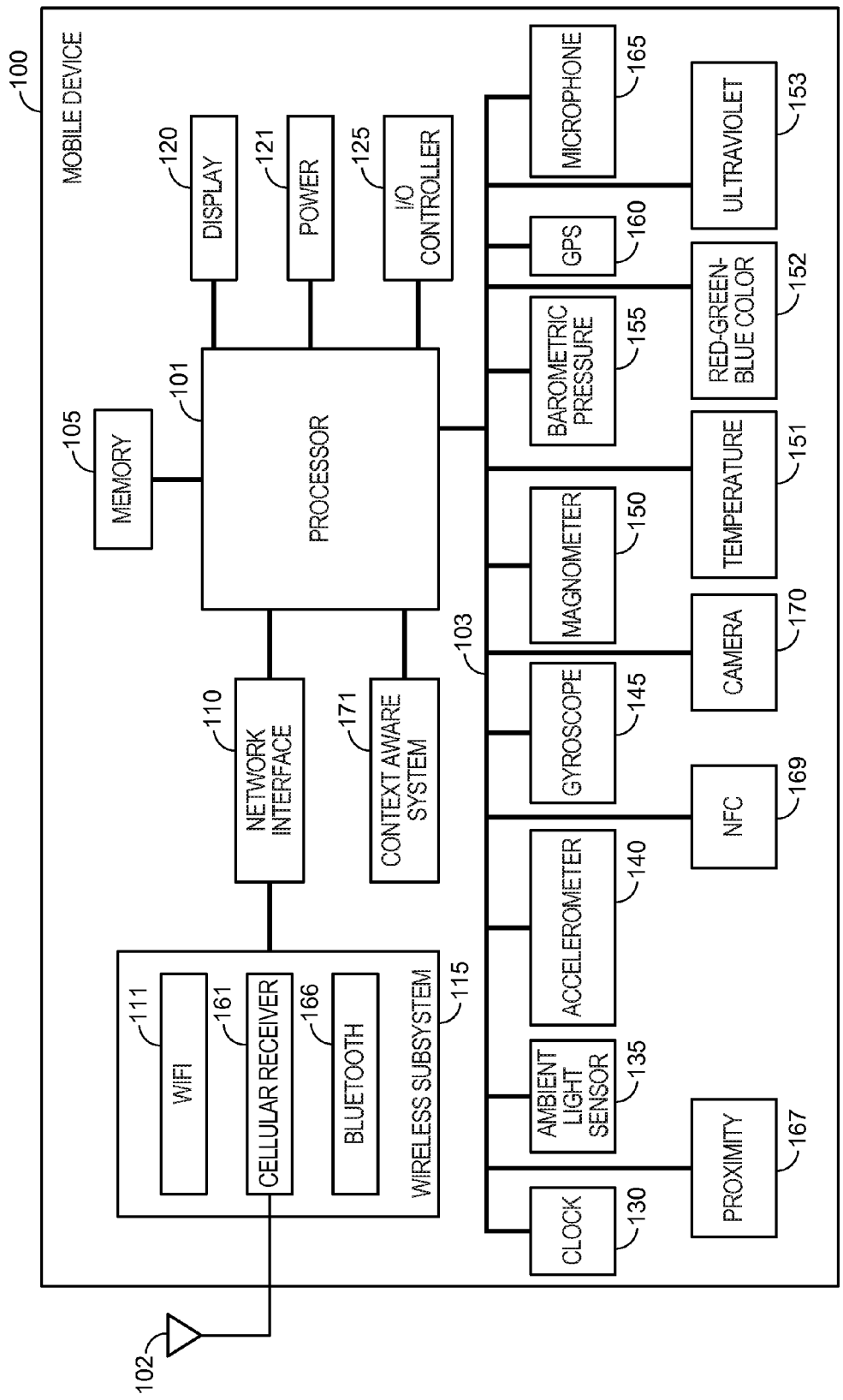
FIG. 1 is a functional block diagram of an example mobile device including a context aware system.

By way of example, FIG. 1 is block diagram illustrating an example mobile device 100. Mobile device 100 may include one or more processors 101 (e.g., a general purpose processor, specialized processor, or digital signal processor), a memory 105, I/O controller 125, and network interface 110. Mobile device 100 may also include a number of device sensors coupled to one or more buses 103 or signal lines further coupled to the processor(s) 101. It should be appreciated that mobile device 100 may also include a display 120, a user interface (e.g., keyboard, touch-screen, or similar devices) (not shown), a power device 121 (e.g., a battery), as well as other components typically associated with electronic mobile devices.

Mobile device 100 optionally includes additional sensors such as a clock 130, ambient light sensor (ALS) 135, accelerometer 140, gyroscope 145, magnetometer 150, temperature sensor 151, barometric pressure sensor 155, red-green-blue (RGB) color sensor 152, ultra-violet (UV) sensor 153, proximity sensor 167, near field communication (NFC) 169, and/or Global Positioning Sensor (GPS) 160. Mobile device 100 may also include a microphone 165, camera 170, and a wireless subsystem 115 (Bluetooth 166, WiFi 111, cellular receiver 161). In some aspects, multiple cameras 170 are integrated or accessible to the device. For example, mobile device 100 may have at least a front and rear mounted camera. In some aspects, other sensors may also have multiple installations or versions.

Memory 105 may be coupled to processor 101 to store instructions for execution by processor 101. In some aspects, memory 105 is non-transitory. Memory 105 may also store one or more models or modules to implement aspects described below. Thus, the memory 105 is a processor-readable memory and/or a computer-readable medium that stores software code (programming code, instructions, etc.) configured to cause the processor 101 to perform the functions described. Alternatively, one or more functions of mobile device 100 may be performed in whole or in part in hardware. Memory 105 may also store data from integrated or external sensors.

Network interface 110 may also be coupled to a number of wireless subsystems 115 (e.g., Bluetooth 166, WiFi 111, Cellular receiver 161, or other networks) to transmit and receive data streams through a wireless link to/from a wireless network, or may be a wired interface for direct connection to networks (e.g., the Internet, Ethernet, or other wireless systems). The mobile device may include one or more local area network transceivers connected to one or more antennas. The local area network transceiver comprises suitable devices, hardware, and/or software for communicating with and/or detecting signals to/from WAPs, and/or directly with other wireless devices within a network. In one aspect, the local area network transceiver may comprise a WiFi (802.11x) communication system suitable for communicating with one or more wireless access points.

Mobile device 100 may also include one or more wide area network transceiver(s) that may be connected to one or more antennas. For example, antenna 102 is coupled to cellular receiver 161 for receiving cellular network signals from one or more base stations of a cellular network. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band, ZigBee, wireless USB, etc.

Mobile device 100 may be any wireless device, cell phone, personal digital assistant, mobile computer, wearable device (e.g., head mounted display, virtual reality glasses, etc.), tablet, personal computer, laptop computer, or any type of device that has processing capabilities. In one example, "mobile device" may be any portable, or movable device or machine that is configurable to acquire wireless signals transmitted from, and transmit wireless signals to, one or more wireless communication devices or networks. Thus, by way of example but not limitation, mobile device 100 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at the device 100. Also, "mobile device" is intended to include all devices, including wireless communication devices, computers, laptops, wearable computers, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above can also be considered a "mobile device" as used herein. Other uses may also be possible. While various examples given in the description below relate to mobile devices, the techniques described herein can be applied to any device for which accurate context inference is desirable.

Mobile device 100 may communicate wirelessly with a plurality of wireless access points (WAPs) using RF signals (e.g., 2.4 GHz, 3.6 GHz, and 4.9/5.0 GHz bands) and standardized protocols for the modulation of the RF signals and the exchanging of information packets (e.g., IEEE 802.11x).

In addition, mobile device 100 includes a context aware system 171. Context aware system 171 is configured to detect whether a current context state of mobile device 100 has changed and also to determine a next context state of the mobile device 100. In one aspect, the context state of mobile device 100 may refer to any state that can be used to characterize the situation of a user/operator of mobile device 100. For example, context aware system 171 may determine that the context state of the mobile device 100 has changed and then separately detect the next context state of the mobile device 100, such as the user is currently in a meeting room and that the user has sat down. Accordingly, one or more client applications may use this current context state of the mobile device to conclude that the user is currently in a meeting and to thus reject any unimportant calls to the mobile device 100.

In one aspect, context aware system 171 includes one or more application program interfaces (APIs) to enable client applications access to the current context state of the mobile device 100. One of more of the client applications may include always-on applications running on the mobile device 100. These always-on applications may require continual, or at least frequent, updates as to the current context state of the mobile device. Thus, conventional systems may include contextual awareness algorithms that continually run to provide the always-on client applications with the required context state information. However, running these complex contextual awareness algorithms so frequently in conventional mobile devices adversely increases power consumption. Accordingly, aspects discussed herein provide for a context aware system 171 that includes multiple power consumption modes for reducing the resource (e.g., power) consumption of the context aware system 171.

In some examples, context aware system 171 can be implemented as a module separate from other elements in mobile device 100. In yet another example, the context aware system 171 may be wholly or partially implemented by other elements illustrated in FIG. 1, for example in the processor 101 and/or memory 105, or in one or more other elements of mobile device 100. As shown in FIG. 1, context aware system 171 is coupled to receive sensor data from sensors 130-170 via bus 103.

It should be appreciated that aspects of the invention as will be hereinafter described may be implemented through the execution of instructions, for example as stored in the memory 105 or other element, by processor 101 and/or other circuitry of device, such as context aware system 171. Particularly, circuitry of mobile device 100, including but not limited to processor 101 and context aware system 171, may operate under the control of a program, routine, or the execution of instructions to execute methods or processes in accordance with aspects of the invention. For example, such a program may be implemented in firmware or software (e.g. stored in memory 105 and/or other locations) and may be implemented by processors, such as processor 101, and/or other circuitry of context aware system 171. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 100 itself and/or some or all of the functions, engines or modules described herein may be performed by another system connected through I/O controller 125 or network interface 110 (wirelessly or wired) to device. Thus, some and/or all of the functions may be performed by another system and the results or intermediate calculations may be transferred back to mobile device 100. In some examples, such other devices may include a server configured to process information in real time or near real time. In some examples, the other device is configured to predetermine the results, for example based on a known configuration of the device. Further, one or more of the elements illustrated in FIG. 1 may be omitted from mobile device 100. For example, one or more of the sensors (e.g., sensors 130-170) may be omitted in some examples.

To reconcile conflicting requirements for growing algorithmic complexity and minimal power consumption in mobiles devices, aspects discussed herein provide for a hierarchical and resource (e.g., power) optimized context aware system 171. In one aspect, the context aware system 171 includes a change detection algorithm for detecting context state changes and a separate classification algorithm for determining what the next context state actually is. The change algorithm may require much less complexity and processing power than the classification algorithm. Thus, context aware system 171 may be implemented as a two-stage system, in which a first module performs frequent (e.g., periodic) processing of change detection algorithm(s), and where a separate second module performs less frequent and more complex classification algorithm(s). In one example, this approach may reduce power consumption because change detection processing power is lower than context classification processing power, by the virtue of the former logic being implemented in fewer gates and memory cells than the later. In one example, during operation of the first module for processing of the change detection algorithm, the second module for processing of the context classification algorithm is in a low power consumption mode, which could include the second module consuming zero power or the second module being power collapsed with only minimal retention leakage, until triggered to transition back to a normal power consumption mode.

Figure 2:
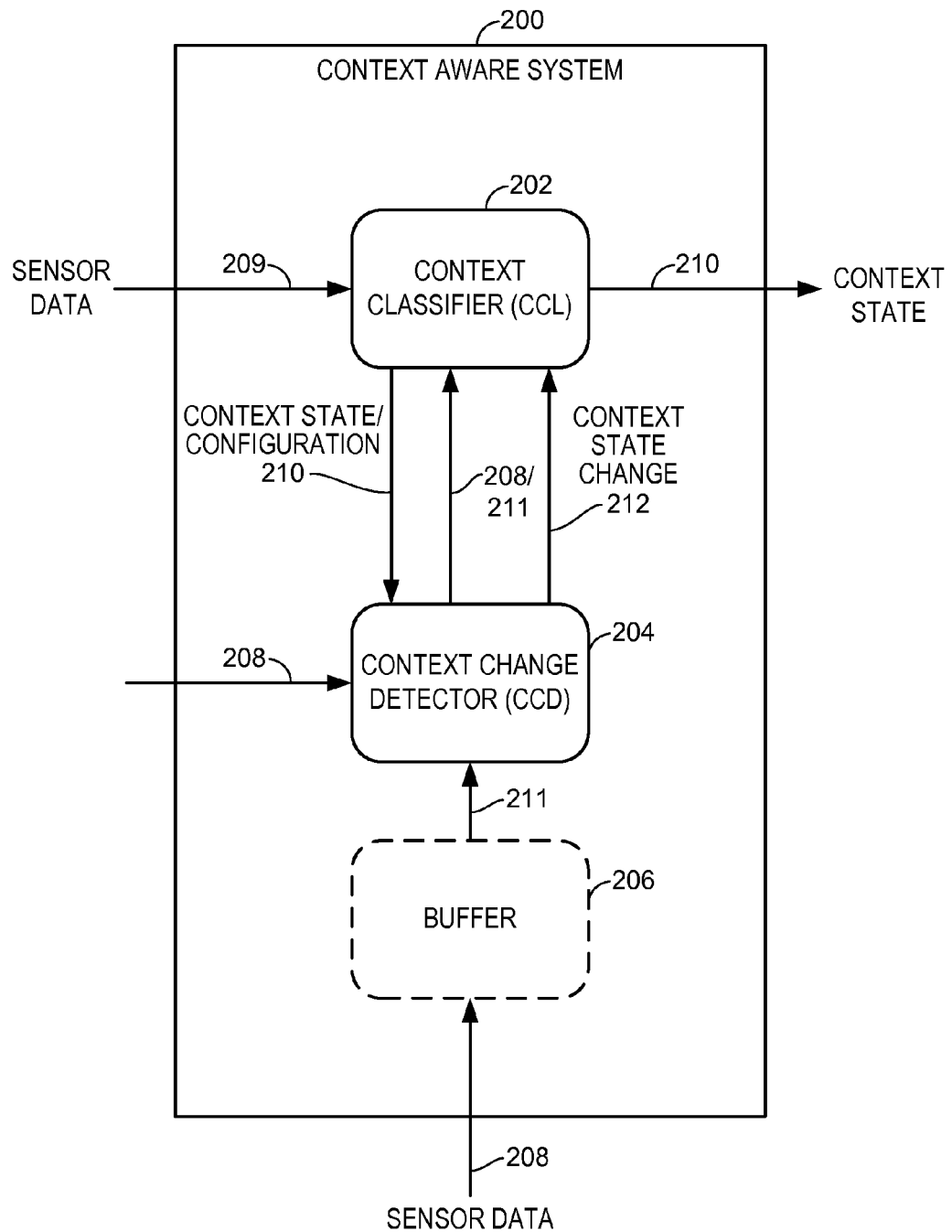
FIG. 2 is a functional block diagram of a context aware system for use in a mobile device.

By way of example, FIG. 2 is a functional block diagram of a context aware system 200 for use in a mobile device. Context aware system 200 is one possible implementation of context aware system 171 of mobile device 100. The illustrated example of context aware system 200 includes a context classifier (CCL) 202 and a context change detector (CCD) 204. In one example, CCD 204 is implemented as a first software module, processor, or logic, and the CCL 202 is implemented as second software module, processor, or logic that is separate and distinct from the first software module, processor, or logic. For example, CCD 204 may be implemented in hardware to conserve power, while CCL 202 is implemented as a software module executed on a processing component (e.g., a processor). Also shown in FIG. 2, is an optional buffer 206. In one example, buffer 206 is implemented within context aware system 200 for storing received sensor data 208 and providing buffered sensor data 211. In another example, buffer 206 may be implemented by memory external to context aware system 200, such as memory 105 of mobile device 100, shown in FIG. 1.

As shown in FIG. 2, CCD 204 may either receive sensor data 208 directly (e.g., from bus 103) or buffered sensor data 211 via buffer 206. CCL 202 is coupled to receive an indication of a change of a current context state of the mobile device by way of context state change signal 212. In one example, context state change signal 212 is an interrupt signal generated by CCD 204. CCL 202 also receives sensor data, either at new sensor data 209 directly (e.g., from bus 103) or buffered sensor data 211 via CCD 204. In the illustrated example, CCL 202 is also configured to provide an indication of the current context state to the CCD 204 by way of a context state/configuration signal 210. In one example, context state/configuration signal 210 indicates the current context state of the mobile device (e.g., mobile device 100). In another example, context state/configuration signal 210 may indicate one or more thresholds associated with respective sensor data for use by the CCD 204 in order to determine a change in the context state.

Figure 3:
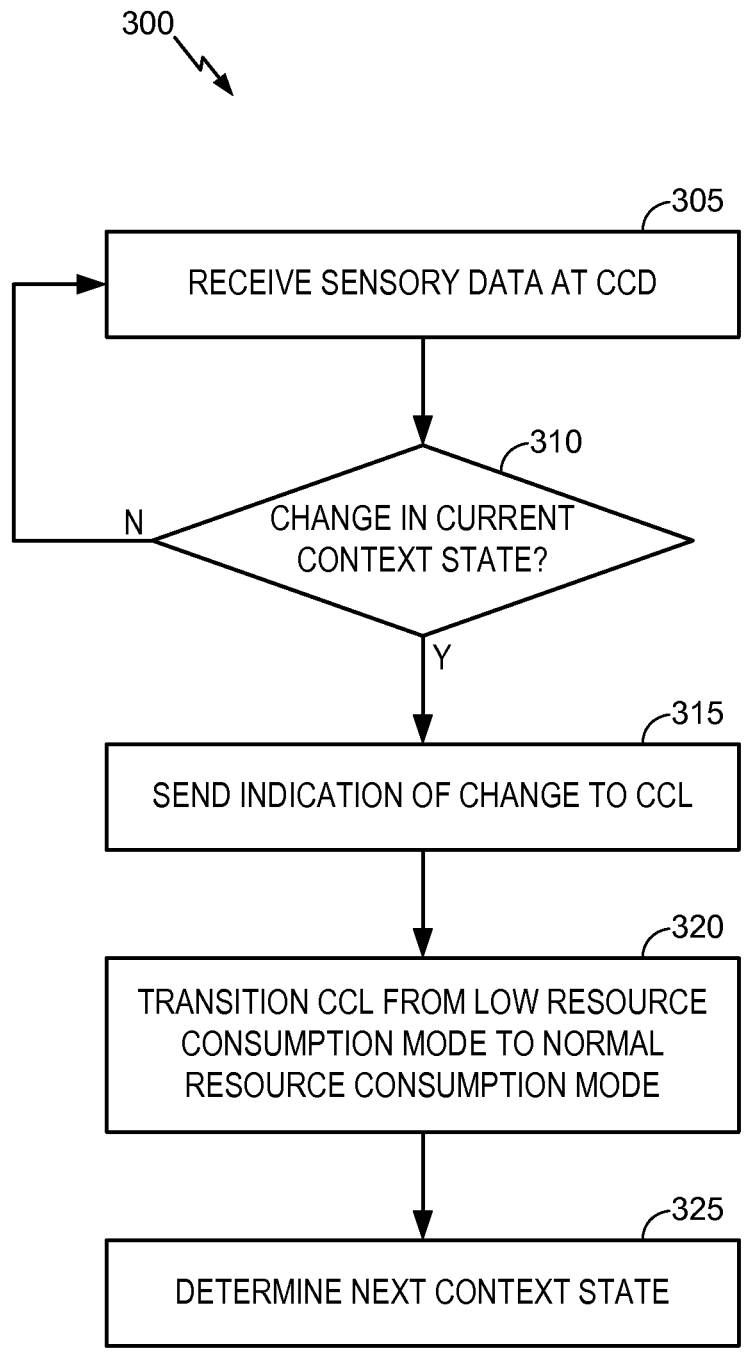
FIG. 3 is a flowchart illustrating an example process of detecting a change in a current context state and determining a next context state of a mobile device in a context aware system.

FIG. 3 is a flowchart illustrating a process 300 of detecting a change in a current context state and determining a next context state of a mobile device in a context aware system. Process 300 is one possible process implemented by context aware system 171 of FIG. 1 and/or context aware system 200 of FIG. 2.

Figure 4:
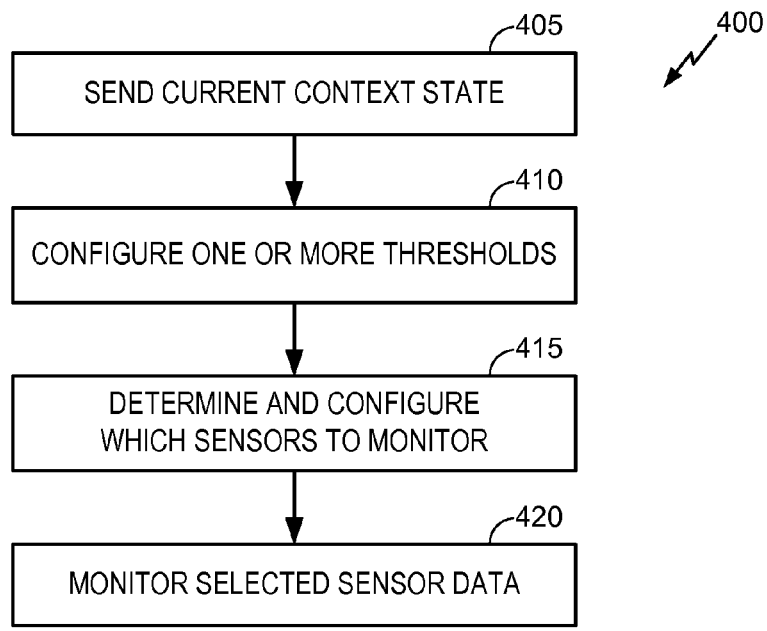
FIG. 4 is a flowchart illustrating an example process of configuring and receiving sensor data at a context change detector of a context aware system.

In process block 305, sensor data 208 is received at CCD 204. As discussed above, CCD 204 may either receive sensor data 208 directly (e.g., from bus 103) or buffered sensor data 211 via buffer 206. Sensor data 208 and/or buffered sensor data 211 includes values sampled from one or more sensors included in the mobile device (e.g., sensors 130-170 of FIG. 1). For example, FIG. 4 is a flowchart illustrating a process 400 of configuring the CCD 204 and for receiving sensor data at CCD 204 of a context aware system. Process 400 is one possible implementation of process block 305 of FIG. 3.

Referring now to FIG. 4, in process block 405, CCL 202 sends, and CCD 204 receives the context state/configuration signal 210. In one example, context state/configuration signal 210 indicates which context state the mobile device (e.g., mobile device 100) is in. In another example, context state/configuration signal 210 may indicate one or more parameters (e.g., which sensors to monitor) and/or thresholds associated with respective sensor data for use by the CCD 204 in order for CCD 204 to detect a change in the context state. Thus, in process block 410, CCL 202 may vary one or more thresholds maintained at CCD 204 by way of the context state/configuration signal 210. For example, mobile device 100 may include various location-based context states. The thresholds related to determining whether these location-based context states have changed may vary, based at least in part on whether the location-based context state relates to a micro place (e.g., living room, office, department, etc.) or a macro place (e.g., building, work, home, park, etc). By way of example, when mobile device 100 is in a first location-based context state, CCD 204 may compare position data obtained from GPS sensor 160 with a first threshold distance. If the position data obtained from GPS sensor 160 indicates that a position of mobile device 100 has changed more than the first threshold distance, CCD 204 may detect that the first location-based context is no longer valid and thus, the current context state has changed. Similarly, when mobile device 100 is in a second location-based context state, CCL 202 may vary the threshold distance used by CCD 204 to a second (e.g., greater) threshold distance to compare with the position data obtained from GPS sensor 160 in order for CCD 204 to detect whether the second location-based context state has changed.

In process block 415, CCL 202 may further determine which sensors to monitor and configure the CCD 204 to monitor only those sensors, by way of the context state/configuration signal 210. As shown in FIG. 1, mobile device 100 includes a plurality of sensors 130-170. However, sensor data from all of the sensors may not be necessary for determining whether the current context state of mobile device 100 has changed. Thus, CCL 202 may determine one or more sensors to be monitored based on the current context state and indicate them to the CCD 204 in context state/configuration signal 210. By way of example, sensor data from proximity sensor 167 may not be necessary for determining whether a location-based context state of mobile device 100 has changed and thus, may be ignored by CCD 204 when monitoring sensor data for changes for this context state. Process block 420 includes the monitoring of the selected sensor data by CCD 204. In one example, CCD 204 samples the selected sensor data periodically at a set frequency. In another example, the frequency with which CCD 204 samples the sensor data varies in response to the current context state and/or depending on which sensor(s) are providing the sensor data.

Returning now to process 300, of FIG. 3, in decision block 310, CCD 204 detects whether a change in the current context state has occurred in response to the received sensor data 208/211 by processing the received sensor data 208/211 to generate one or more features. In one example, a feature is an individual measurable property of a phenomenon being observed (e.g., the sensor data 208/211). For example, the feature may be a mean, variance, or standard deviation of sensor data 208/211. CCD 204 then compares the one or more features with their respective thresholds in order to determine whether there has been a change in the current context state. In another example, CCD 204 may be configured to perform a statistical function on at least one of the generated features in order to generate a statistical value. The CCD 204 may then compare the statistical value with a threshold in order to determine whether a change in the current context state has occurred. By way of example, the statistical function may be a statistical classification algorithm utilized by CCD 204 on the generated features, such as binary logistic regression, or a Gaussian mixture model classifier, etc.

In one example, the aforementioned processes of CCD 204 detecting a change in the current context state may be implemented by way of the periodic processing of a change detection algorithm included in CCD 204. If CCD 204 determines that there is no change in the current context state, process 300 returns to process block 305, where CCD 204 continues to receive and monitor the sensor data 208/211. If, however, the CCD 204 detects that there is a change in the current context state, process 300 proceeds to process block 315, where CCD 204 sends an indication of the change in the current context state to CCL 202. As mentioned above, context state change signal 212 may be an interrupt signal generated by CCD 204. Therefore, CCD 204 detects a change in the current context state without determining what the next or new context state of the mobile device will be. Accordingly, the context state change signal 212 generated by CCD 204 indicates that there is a change in the current context state of the mobile device, but does not indicate what the next or new context state of the mobile device is.

Next, in process block 320, CCL 202 transitions from a low power consumption mode to a normal power consumption mode in response to the context state change signal 212 indicating a change in the current context state. In one example, the low power consumption mode includes the CCL 202 consuming less memory, power, or processor execution cycles than when CCL 202 is in the normal power consumption mode. By way of example, CCL 202 is power collapsed where context classification algorithms included in CCL 202 cease to operate when CCL 202 is in the low power consumption mode. CCL 202 may be configured to remain in the low power consumption mode, and thus reducing power consumption of the context aware system 200, until CCD 204 determines that there is a change in the current context state. Therefore, in one example, context classification algorithms included in CCL 202 are only allowed to operate during the normal power consumption mode, where the CCL 202 consumes more power in the normal power consumption mode compared to when CCL 202 is in the low power consumption mode.

Figure 5:
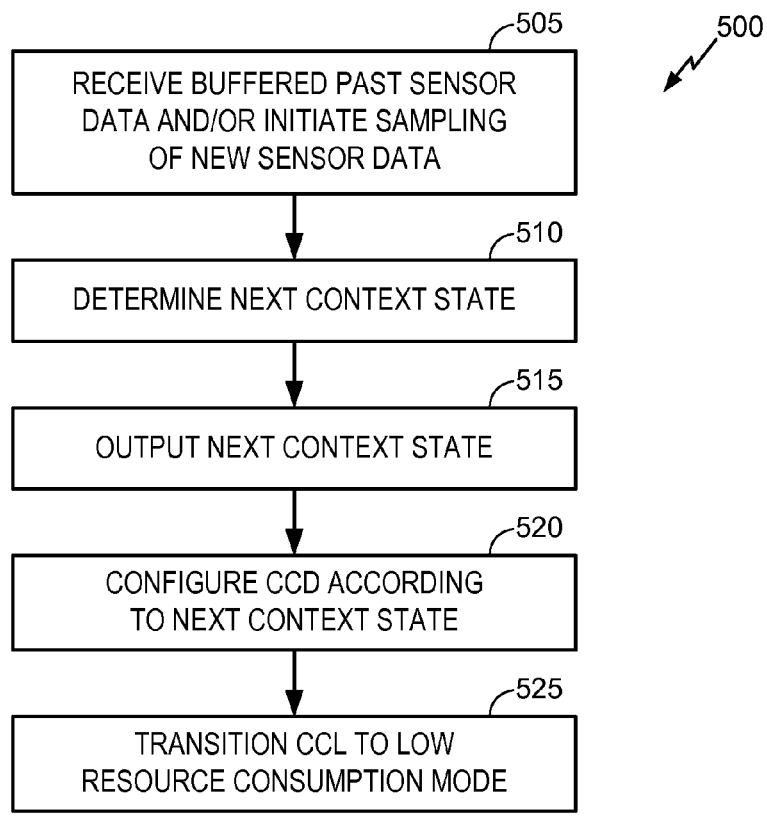
FIG. 5 is a flowchart illustrating an example process of determining a next context state of a mobile device in a context classifier of a context aware system.

Next, in process block 325, CCL 202 determines a next context state of the mobile device while CCL 202 is in the normal power consumption mode. FIG. 5 is a flowchart illustrating a process 500 of determining a next context state of a mobile device in a context classifier of a context aware system. Process 500 is one possible implementation of process block 325 of process 300. In process block 505, CCL 202 receives new sensor data 209 and/or buffered past sensor data 211. In one example, the buffered past sensor data 211 includes the same samples of the sensor data used by the CCD 204 to determine the change in the context state. Thus, once in the normal power consumption mode, CCL 202 may receive buffered past sensor data 211 that is stored in buffer 206 of context aware system 200. Buffered past sensor data 211 may include multiple time-ordered (e.g., time-stamped) samples from the same sensor. For example, buffered past sensor data 211 may include multiple samples of accelerometer data obtained from accelerometer 140 over a period of time. Buffered past sensor data 211 may also contain data from multiple sensors of the mobile device 100.

In another example, the sensor data received in process block 505 is new sensor data 209. Thus, in process block 505, once CCL 202 transitions to the normal power consumption mode, CCL 202 may then initiate a sampling of new sensor data 209. That is, rather than just receiving the buffered past sensor data 211, CCL 202 may request, either directly, or via CCD 204, the sampling of one or more new sensor data 209. For example, if CCD 204 determines that a location-based context state has changed, CCL 202 may then request current position data from GPS sensor 160, so as to be able to determine the next context state of the mobile device. In one aspect, the new sensor data 209 is sampled or otherwise requested by CCL 202 after the CCD 204 has determined a change in the current context state. In one example, the new sensor data 209 that is sampled or requested by CCL 202 is sensor data from the same one or more sensors used by CCD 204 to determine the change in the current context state. However, in another example, CCD 204 may request new sensor data 209 from a sensor of mobile device 100 that was not used by CCD 204 in determining the change in the current context state. As shown in FIG. 2, CCL 202 receives new sensor data 209 directly (e.g., via bus 103). However, CCL 202 may also receive new sensor data 209 from buffer 206 via CCD 204. In one example, CCD 204 may push relevant sensor data 208 to CCL 202 upon determining that a current context state of the mobile device has changed.

Next, in process block 510, CCL 202 determines a next context state of the mobile device in response to the received sensor data 209/211. As mentioned above, the received sensor data may include buffered past sensor data 211 and/or new sensor data 209. In one example, CCL 202 determines the next context state of the mobile device through processing of a classification algorithm included in CCL 202. As further mentioned above, the classification algorithm included in CCL 202 may only operate when CCL 202 is in the normal power consumption mode and thus, is disabled when CCL 202 is in the low power consumption mode.

In process block 515, once CCL 202 has determined the next context state of the mobile device, CCL 202 generates one or more signals indicating what the next context state is. For example, CCL 202 outputs the newly determined context state 211 to one or more client applications via an API. In another example, CCL 202 provides an indication, by way of context state/configuration signal 210, of the newly determined context state to CCD 204, so that CCD 204 may begin the monitoring for a change from the newly determined next context state. Furthermore, CCL 202 may configure the CCD 204 according to the newly determined next context state. Thus, process block 520 includes the CCL 202 providing one or more thresholds and or parameters (e.g., indication of which sensors to monitor) by way of context state/configuration signal 210 for use by the CCD 204 in determining a change from the newly determined next context state.

Next, in process block 525, CCL 202 then transitions back to the low power consumption mode (e.g., low power consumption mode) after determining the next context state of the mobile device. In one example, CCL 202 may wait a time period after determining the next context state of the mobile device before transitioning back to the low power consumption mode in case there is another context change of the mobile device that occurs soon after the last context state change. Thus, CCL 202 may include a timer (not shown) that begins counting in response to CCL 202 determining the next context state of the mobile device. If no context state change signal 212 is received before expiration of a predetermined time period, then CCL 202 may then transition to the low power consumption mode. If however, a context state change signal 212 is received before expiration of the predetermined time period, then CCL 202 may remain in the normal power consumption mode, at least until the next context state of the mobile device is determined. In another example, CCL 202 and CCD 204 both monitor the next state (after configuring CCD 204 to the next state) for a time period, to make sure the next state is stable enough to last long enough to let CCL 202 transition to the low power state for a minimum amount of time.

Figure 6:
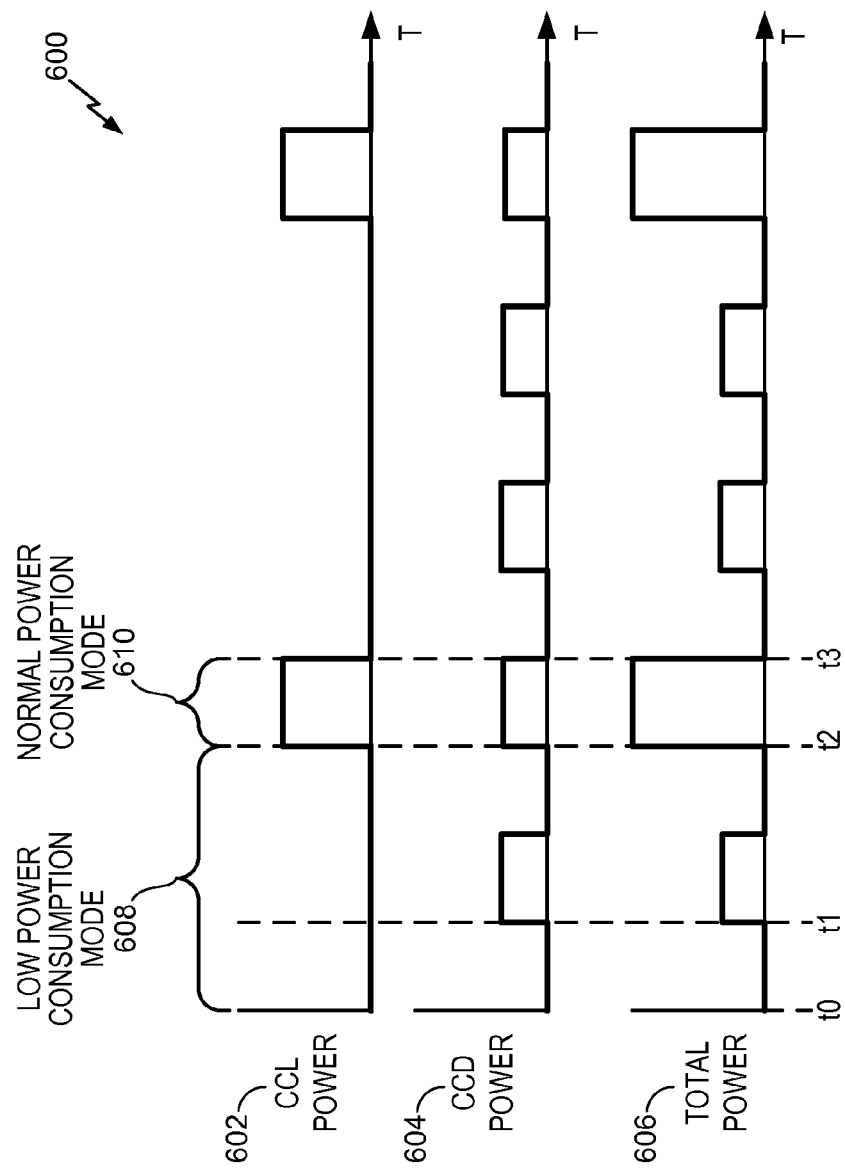
FIG. 6 is a diagram illustrating power consumption of a context aware system.

FIG. 6 is a diagram 600 illustrating the power consumption of a context aware system, such as context aware system 200 of FIG. 2. Diagram 600 illustrates a CCL power 602, a CCD power 604, and a total power 606. CCL power 602 may be representative of the power consumed by CCL 202 during operation, CCD power 604 may be representative of the power consumed by CCD 204 during operation, and total power 606 may be representative of the total power consumed by context aware system 200 during operation. At time t0, CCL 202 is in the low power consumption mode 608. At time t1, CCD 204 monitors sensor data and determines that there is no change in the current context state of the mobile device. Thus, at time t1, CCL 202 remains in the low power consumption mode 608. However, at time t2, CCD 204 determines that there now has been a change in the current context state and thus generates the context state change signal 212 to transition CCL 202 to the normal power consumption mode 610. As shown in FIG. 6, CCL 202 consumes more power when in the normal power consumption mode 610 than when in the low power consumption mode 608. In one example, when in the low power consumption mode 608, CCL 202 is power collapsed, such that CCL 202 consumes substantially no power, not considering leakage or other residual power draw of CCL 202 depending on the software module, processor, or logic used in the implementation of CCL 202. At time t3, after CCL 202 has determined the next context state of the mobile device, CCL 202 transitions back to the low power consumption mode 608, where CCD 204 continues to monitor the sensor data for detection of a change in the context state. Accordingly, aspects of a context aware system 171 that separate context change detection algorithms (e.g., in a CCD 204) from context classification algorithms (e.g., in a CCL 202), allows for the more complex and resource intensive algorithms of CCL 202 to be shut down until actually needed, thus, reducing overall power consumption of the context aware system 171.

Furthermore, as can be seen by way of the illustrated pulses in power consumption of CCL power 602 and CCD power 604, change detection algorithms included in CCD 204 may operate at a higher frequency than that of the classification algorithms included in CCL 202.

Figure 7:
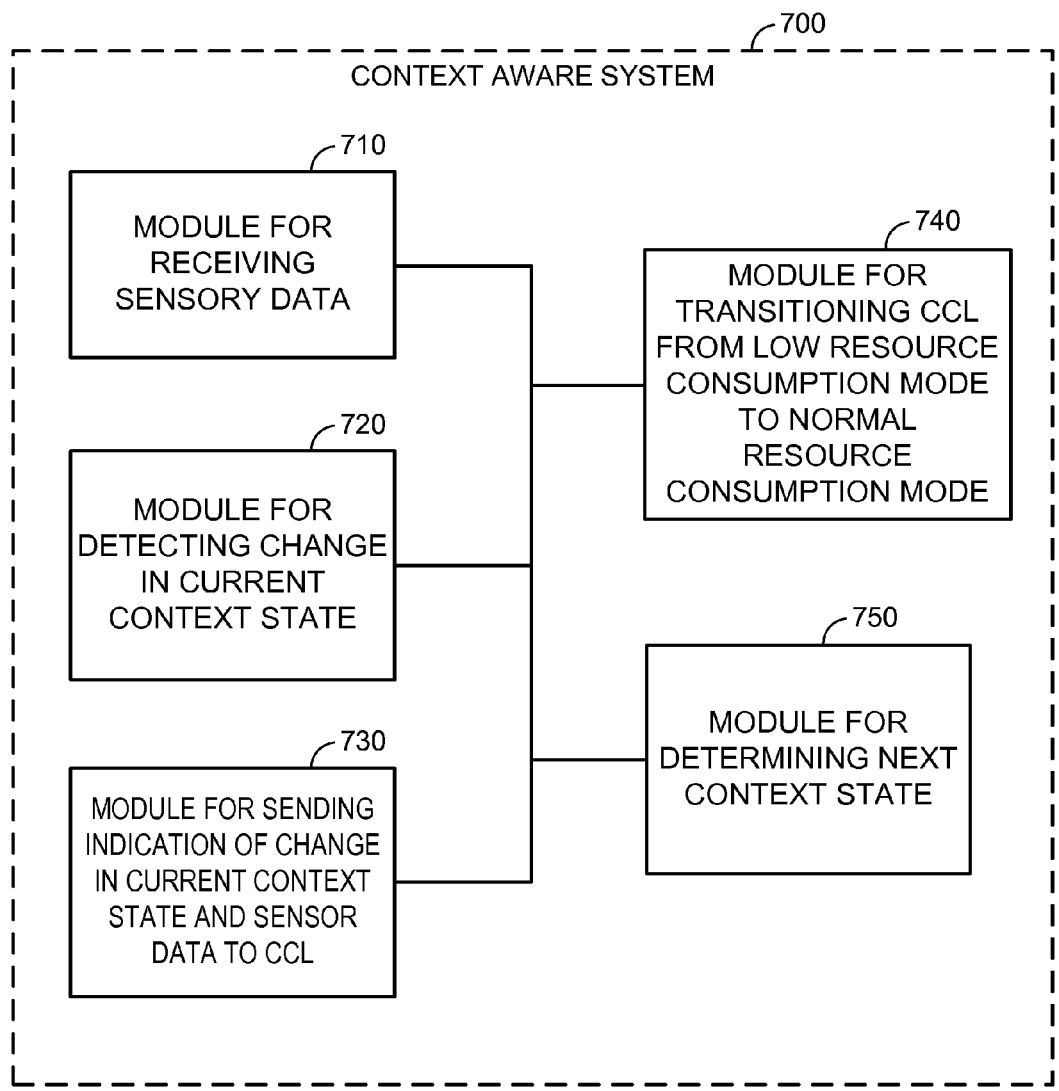
FIG. 7 is a simplified block diagrams illustrating several sample aspects of components that may be employed in a context aware system for use in a mobile device.

FIG. 7 is a simplified block diagram illustrating several sample aspects of components that may be employed in a context aware system 700 for use in a mobile device. Context aware system 700 is one possible implementation of context aware system 171 of FIG. 1 and/or context aware system 200 of FIG. 2, represented as a series of interrelated functional modules.

A module 710 for receiving sensor data may correspond at least in some aspects to, for example, a software module, processor, or logic circuit, such as CCD 204 and/or buffer 206. Module 720 for detecting a change in the current context state, module 730 for sending an indication of a change in the current context state and optionally, the sensor data, to the CCL 202, and module 740 for transitioning the CCL 202 from the low power consumption mode to the normal power consumption mode may also correspond, in some aspects, to a software module, processor, or logic circuit, such as CCD 204. Module 750 for determining a next context state of the mobile device 100 may correspond to a software module, processor, or logic circuit, such as CCL 202.

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

Various modifications to the aspects disclosed herein will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A context aware system for use in a mobile device, the context aware system comprising:
   a context change detector (CCD) configured to receive sensor data from one or more sensors of the mobile device and to detect a change in a current context state of the mobile device based on the received sensor data without determining what a next context state of the mobile device will be, wherein the CCD is configured to detect the change in the current context state by:
processing the received sensor data to generate one or more features, wherein the one or more features includes at least one feature selected from the group consisting of a mean of the received sensor data, a variance of the received sensor data, or a standard deviation of the received sensor data, and
comparing the one or more features with one or more respective thresholds; and
a context classifier (CCL) coupled to the CCD, wherein the CCL is configured to transition from a low power consumption mode to a normal power consumption mode in response to the CCD detecting the change in the current context state, and wherein the CCL is further configured to determine the next context state of the mobile device while in the normal power consumption mode, wherein the CCL is configured to vary the one or more respective thresholds in response to the current context state of the mobile device.

2. The context aware system of claim 1, wherein the CCL is configured to transition to the low power consumption mode after determining the next context state of the mobile device.

3. The context aware system of claim 1, wherein the CCD is configured to receive an indication of the current context state from the CCL, and wherein the CCD is configured to detect the change in the current context state based on the current context state and based on the received sensor data.

4. The context aware system of claim 3, wherein the mobile device includes a plurality of sensors for providing sensor data to the CCD, wherein, in response to the indication of the current context state that is received from the CCL, the CCD is configured to determine which of the plurality of sensors to monitor to detect the change in the current context state.

5. The context aware system of claim 1, wherein the CCD is implemented as a first software module, processor, or logic, and wherein the CCL is implemented as second software module, processor, or logic that is separate and distinct from the first software module, processor, or logic.

6. The context aware system of claim 1, wherein the CCD includes a change detection algorithm for detecting the change in the current context state of the mobile device and the CCL includes a classification algorithm for determining the next context state of the mobile device, and wherein the change detection algorithm operates at a higher frequency than that of the classification algorithm.

7. The context aware system of claim 1, wherein the CCL is configured to receive buffered past sensor data from a buffer of the mobile device in response to the CCD detecting the change in the current context state, and wherein the CCL is further configured to determine the next context state of the mobile device in response to the buffered past sensor data.

8. The context aware system of claim 1, wherein the CCL is configured to initiate a sampling of new sensor data in response to the CCD detecting the change in the current context state, and wherein the CCL is further configured to determine the next context state of the mobile device in response to the new sensor data.

9. A context aware system for use in a mobile device, the context aware system comprising:
a context change detector (CCD) configured to receive sensor data from one or more sensors of the mobile device and to detect a change in a current context state of the mobile device based on the received sensor data without determining what a next context state of the mobile device will be, wherein the CCD is configured to detect the change in the current context state by:
processing the received sensor data to generate one or more features;
performing a statistical function on at least one of the one or more features to generate a statistical value; and
comparing the statistical value with a threshold; and
a context classifier (CCL) coupled to the CCD, wherein the CCL is configured to transition from a low power consumption mode to a normal power consumption mode in response to the CCD detecting the change in the current context state, and wherein the CCL is further configured to determine the next context state of the mobile device while in the normal power consumption mode, wherein the CCL is configured to vary the threshold in response to the current context state of the mobile device.

10. A method comprising:
receiving sensor data at a context change detector (CCD) of the context aware system included in a mobile device, wherein the sensor data is received from one or more sensors of the mobile device;
detecting, by the CCD, a change in the a current context state of the mobile device based on the received sensor data without determining what a next context state of the mobile device will be, wherein detecting the change in the current context state includes:
processing the received sensor data to generate one or more features; and
comparing the one or more features with one or more respective thresholds, wherein the one or more features includes at least one feature selected from the group consisting of a mean of the received sensor data, a variance of the received sensor data, or a standard deviation of the received sensor data;
varying the one or more respective thresholds in response to the current context state;
sending an indication of the change in the current context state to a context classifier (CCL) of the context aware system in response to the CCD detecting the change;
transitioning the CCL from a low power consumption mode to a normal power consumption mode in response to receiving the indication of the change in the current context state; and
determining, by the CCL, the next context state of the mobile device while in the normal power consumption mode.

11. The method of claim 10, further comprising, transitioning the CCL to the low power consumption mode after determining the next context state of the mobile device.

12. The method of claim 10, further comprising, receiving, at the CCD, an indication of the current context state from the CCL, wherein detecting, by the CCD, the change in the current context state includes detecting the change in the current context state based on the current context state and based on the received sensor data.

13. The method of claim 12, wherein the mobile device includes a plurality of sensors for providing sensor data to the CCD, wherein the method further comprises determining, in response to the indication of the current context state, which of the plurality of sensors that the CCD is to monitor to detect the change in the current context state.

14. A method comprising:
receiving sensor data at a context change detector (CCD) of the context aware system included in a mobile device, wherein the sensor data is received from one or more sensors of the mobile device;
detecting, by the CCD, a change in the a current context state of the mobile device based on the received sensor data without determining what a next context state of the mobile device will be, wherein detecting the change in the current context state includes:
processing the received sensor data to generate one or more features;
performing a statistical function on at least one of the one or more features to generate a statistical value; and
comparing the statistical value with a threshold;
sending an indication of the change in the current context state to a context classifier (CCL) of the context aware system in response to the CCD detecting the change;
transitioning the CCL from a low power consumption mode to a normal power consumption mode in response to receiving the indication of the change in the current context state; and
determining, by the CCL, the next context state of the mobile device while in the normal power consumption mode, wherein the CCL is configured to vary the threshold in response to the current context state of the mobile device.

15. A context aware system for use in a mobile device, the context aware system comprising:
means for receiving sensor data at a context change detector (CCD) of the context aware system included in a mobile device, wherein the sensor data is received from one or more sensors of the mobile device;
means for detecting, by the CCD, a change in the a current context state of the mobile device based on the received sensor data without determining what a next context state of the mobile device will be, wherein the means for detecting, by the CCD, the change in the current context state includes:
means for processing the received sensor data to generate one or more features, wherein the one or more features includes at least one feature selected from the group consisting of a mean of the received sensor data, a variance of the received sensor data, or a standard deviation of the received sensor data; and
means for comparing the one or more features with one or more respective thresholds;
means for varying the one or more respective thresholds in response to the current context state;
means for sending an indication of the change in the current context state to a context classifier (CCL) of the context aware system in response to the CCD detecting the change;
means for transitioning the CCL from a low power consumption mode to a normal power consumption mode in response to receiving the indication of the change in the current context state; and
means for determining, by the CCL, the next context state of the mobile device while in the normal power consumption mode.

16. The context aware system of claim 15, further comprising, means for transitioning the CCL to the low power consumption mode after determining the next context state of the mobile device.

17. The context aware system of claim 15, further comprising, means for receiving, at the CCD, an indication of the current context state from the CCL, wherein the means for detecting, by the CCD, the change in the current context state includes means for detecting the change in the current context state based on the current context state and based on the received sensor data.

18. The context aware system of claim 15, wherein the CCD is implemented as a first software module, processor, or logic, and wherein the CCL is implemented as second software module, processor, or logic that is separate and distinct from the first software module, processor, or logic.

19. A non-transitory computer-readable medium including program code stored thereon for use by a context aware system of a mobile device, the program code comprising instructions to:
receive sensor data at a context change detector (CCD) of the context aware system from one or more sensors of the mobile device;
detect, by the CCD, a change in the a current context state of the mobile device based on the received sensor data without determining what a next context state of the mobile device will be, wherein the instructions to detect the change in the current context state includes instructions to:
process, by the CCD, the received sensor data to generate one or more features, wherein the one or more features includes at least one feature selected from the group consisting of a mean of the received sensor data, a variance of the received sensor data, or a standard deviation of the received sensor data; and
compare, by the CCD, the one or more features with one or more respective thresholds;
vary the one or more respective thresholds in response to the current context state of the mobile device;
send an indication of the change in the current context state to a context classifier (CCL) of the context aware system in response to the CCD detecting the change;
transition the CCL from a low power consumption mode to a normal power consumption mode in response to receiving the indication of the change in the current context state; and
determine, by the CCL, the next context state of the mobile device while in the normal power consumption mode.

20. The non-transitory computer-readable medium of claim 19, wherein the program code further comprises instructions to transition the CCL to the low power consumption mode after determining the next context state of the mobile device.

21. The non-transitory computer-readable medium of claim 19, wherein program code further comprises instructions to receive, at the CCD, an indication of the current context state from the CCL, and wherein the instructions to determine the change in the current context state is based on the current context state and based on the received sensor data.

22. The non-transitory computer-readable medium of claim 19, wherein the CCD is implemented as a first software module, processor, or logic, and wherein the CCL is implemented as second software module, processor, or logic that is separate and distinct from the first software module, processor, or logic.

* * * * *